Figure 1:
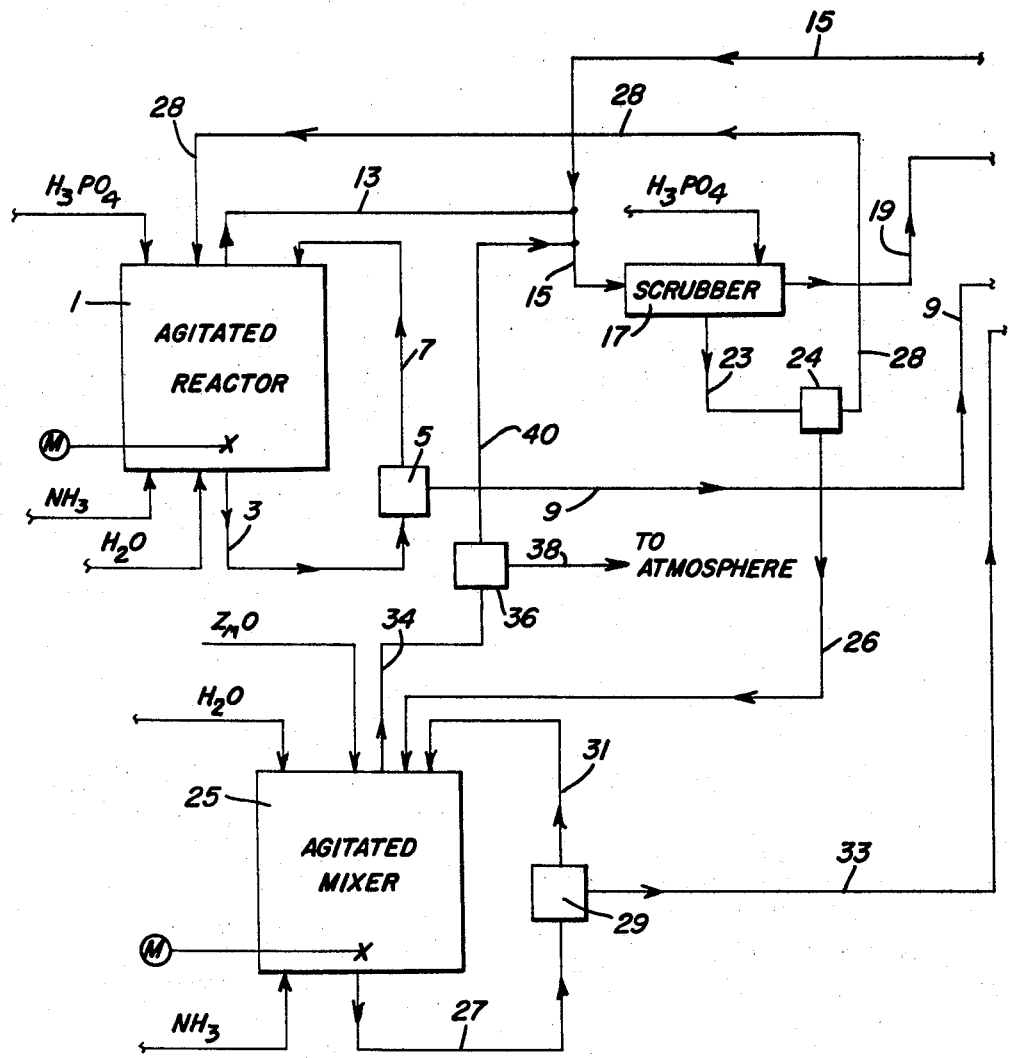

INVENTOR
Maria G. Dunseth

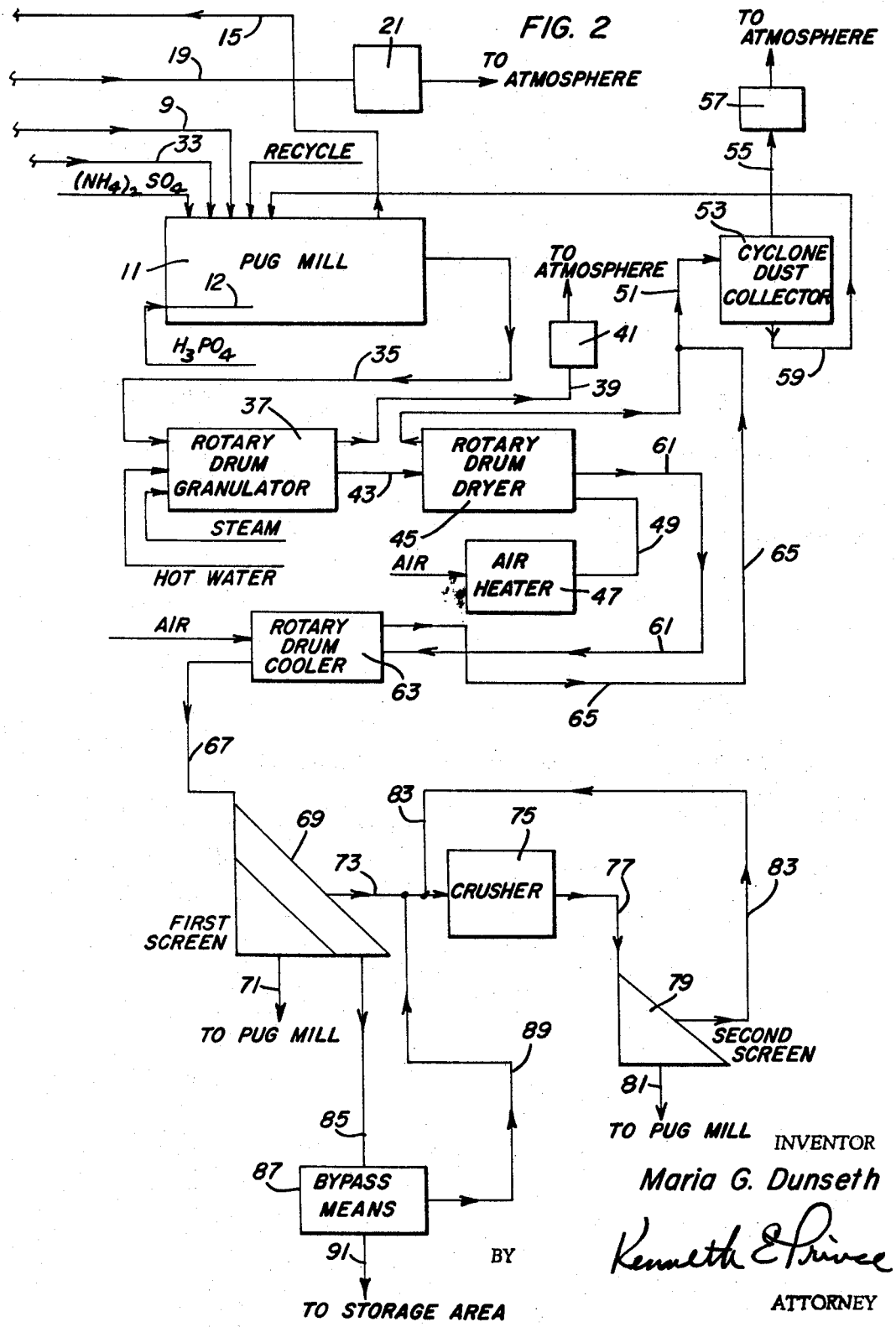

3,385,660
CONTINUOUS MULTISTEP PROCESS FOR PREPARING GRANULAR ZINC AMMONIUM PHOSPHATE

Maria G. Dunseth, 5211 St. Albans Way, Baltimore, Md. 21212
Filed Oct. 21, 1966, Ser. No. 588,508
10 Claims. (Cl. 23—105)

This invention relates to zinc ammonium phosphate. More specifically, this invention relates to a continuous multistep process for producing granular zinc ammonium phosphate.

In summary, this invention relates to a continuous multistep process for preparing granular zinc ammonium orthophosphate in a yield of at least about 95% of theory comprising: (a) continuously preparing a first flowable slurry comprising ammonium orthophosphate in water, said slurry having an atomic ratio of N:P of about 1:1 to 1.1:1, by continuously reacting an ammoniating fluid selected from the group consisting of liquid anhydrous ammonia and aqueous ammonia, analyzing about 20-30% $NH_3$, with an aqueous solution of orthophosphoric acid, analyzing about 20-60% $P_2O_5$, selected from the group consisting of wet process orthophosphoric acid and furnace grade orthophosphoric acid in an agitated reactor while continuously adding water to the agitated reactor at such rate as to maintain the moisture content of the first flowable slurry within the range of about 18-30%, based on the total weight of said slurry; (b) continuously circulating a substantial portion of the first flowable slurry from the bottom to the top of the agitated reactor in a slurry circulating circuit external to the agitated reactor, and continuously separating a first sidestream of said first flowable slurry from said circuit, said first sidestream being separated at a rate substantially equal to the rate at which the first flowable slurry is formed in the agitated reactor; (c) continuously passing the first sidestream into the upper portion of the upstream end of a pug mill; (d) continuously preparing a second flowable slurry comprising zinc oxide in water by continuously adding particulate zinc oxide, analyzing at least about 75% ZnO, to an agitated mixer at a rate substantially stoichiometrically equivalent to the rate at which the first flowable slurry is formed in the aforesaid agitated reactor while continuously adding water to the agitated mixer at such rate as to maintain the moisture content of the second flowable slurry within the range of about 60-80% based on the total weight of said slurry; (e) continuously circulating a substantial portion of the second flowable slurry from the bottom to the top of the agitated mixer in a slurry circulating circuit external to the agitated mixer and continuously separating a second sidestream of said second flowable slurry from said circuit, said sidestream being separated at a rate substantially equal to the rate at which the second flowable slurry is formed in the agitated reactor; (f) continuously passing the second sidestream into the upper portion of the upstream end of the pug mill; (g) continuously recycling to the upper portion of the upstream end of the pug mill a sufficient quantity of product from later mentioned sizing and crushing steps to maintain a recycle ratio of about 3:1 to 10:1, said ratio being the weight ratio of recycled product:recovered product; (h) continuously adding ammonium sulfate to the upper portion of the upstream end of the pug mill at a rate of about 10-20 lbs. of ammonium sulfate per ton of recovered product; (i) continuously withdrawing irregularly shaped granular material from the downstream end of the pug mill; (j) continuously passing the withdrawn material into the upstream end of a rotary granulator where the irregular granular material is smoothed by rotating in the presence of steam and hot water, thereby to produce smooth granules; (k) continuously withdrawing the smooth granules from the downstream end of the granulator; (l) continuously passing the smooth granules into the upstream end of a rotary drum drier where the granules are dried by rotating in the presence of a stream of air having an inlet temperature about 300-450° F.; (m) continuously withdrawing the dried smooth granules from the downstream end of the rotary drier; (n) continuously passing the dried smooth granules into the upstream end of a rotary cooler where the granules are cooled by a stream of air which enters the cooler at ambient temperature; (o) continuously withdrawing the cooled granules from the downstream end of the cooler; (p) continuously passing the cooled granules to a first screen, said first screen having a double deck with a first deck having a screen of about 6-8 mesh and a second deck having a screen of about 10-14 mesh; (q) continuously screening the cooled granules, thereby to continuously obtain a first portion of fine particle which pass about a 10-14 mesh screen, a portion of product size granules which pass about a 6-8 mesh screen and are retained on about a 10-14 mesh screen, and a first portion of oversize particles which are retained on about a 6-8 mesh screen; (r) continuously recycling the first portion of fine particles to the pug mill; (s) continuously passing the first portion of oversize particles into the upstream end of a crusher; (t) continuously crushing the first portion of oversize particles in the crusher; (u) continuously removing the thus crushed particles from the downstream end of the crusher; (v) continuously passing the thus crushed particles to a second screen having a single deck with about a 10-14 mesh screen therein; (w) continuously screening the thus crushed particles to obtain a second portion of fine particles and a second portion of oversize particles; (x) continuously recycling the second portion of fine particles to the pug mill; (y) continuously recycling the second portion of oversize particles into the upstream end of the crusher; (z) continuously passing a quantity of product size granules sufficient to maintain the recycle ratio within the range of about 3:1 to 10:1 to the crusher; and (aa) recovering the remainder of the product size granules.

In preferred embodiments of this invention: (a) the particulate zinc oxide analyzes at least about 90% ZnO; (b) the ammoniating fluid is liquid anhydrous ammonia; (c) the orthophosphoric acid is wet process orthophosphoric acid analyzing about 52-55% $P_2O_5$; and (d) the recycle ratio is about 4:1 to 8:1.

In an embodiment of this invention granular zinc ammonium orthophosphate is prepared in a yield of at least about 95% of theory by a process comprising: (a) continuously preparing a flowable slurry comprising zinc oxide, ammonia, and water by continuously adding particulate zinc oxide analyzing at least about 75% ZnO, an ammoniating fluid selected from the group consisting of liquid anhydrous ammonia and aqueous ammonia analyzing about 20-30% $NH_3$, and water to an agitated reactor at such rates that the mole ratio of $NH_3$:ZnO of the resulting flowable slurry is substantially 1:1 to 1.1:1 and that the moisture content of said slurry is within the range of about 60-80%; (b) continuously circulating a substantial portion of the flowable slurry from the bottom to the top of the agitated mixer in a slurry circulating circuit external to the agitated mixer while continuously separating a sidestream of the flowable slurry from said circuit, said sidestream being separated at a rate substantially equal to the rate at which the flowable slurry is formed in the agitated reactor; (c) continuously passing the sidestream of flowable slurry into the upper portion of the upstream end of a pug mill; (d) continuously adding an aqueous solution of orthophosphoric acid, analyzing about 20–60% $P_2O_5$, and selected from the group consisting of wet process orthophosphoric acid and furnace grade orthophosphoric acid to the pug mill via at least one sparger positioned in the lower portion of about the upstream half of the pug mill beneath the blades of the pug mill, said acid being added to the pug mill at such rate as to maintain an atomic ratio of N:P of about 1:1 to 1.1:1 in the pug mill; (e) continuously recycling to the upper portion of the upstream end of the pug mill a sufficient quantity of product from later mentioned sizing and crushing steps to maintain a recycle ratio of about 3:1 to 10:1, said ratio being the weight ratio of recycled product: recovered product; (f) continuously adding ammonium sulfate to the upper portion of the upstream end of the pug mill at a rate of about 10–20 lbs. of ammonium sulfate per ton of recovered product; (g) continuously withdrawing irregularly shaped granular material from the downstream end of the pug mill; (h) continuously passing the withdrawn material into the upstream end of a rotary granulator where the irregular granular material is smoothed by rotating in the presence of steam and hot water, thereby to produce smooth granules; (i) continuously withdrawing the smooth granules from the downstream end of the granulator; (j) continuously passing the smooth granules into the upstream end of a rotary drum drier where the granules are dried by rotating in the presence of a stream of air having an inlet temperature of about 300–450° F.; (k) continuously withdrawing the dried smooth granules from the downstream end of the rotary drier; (l) continuously passing the dried smooth granules into the upstream end of a rotary cooler where the smooth granules are cooled by a stream of air which enters the cooler at ambient temperature; (m) continuously withdrawing the cooled granules from the downstream end of the cooler; (n) continuously passing the cooled granules to a first screen, said first screen having a double deck with a first deck having a screen of about 6–8 mesh and a second deck having a screen of about 10–14 mesh; (o) continuously screening the thus cooled granules, thereby to continuously obtain a first portion of fine particles which pass about a 10–14 mesh screen, a portion of product size granules which pass about a 6–8 mesh screen and are retained on about a 10–14 mesh screen, and a first portion of oversize particles which are retained on about a 6–8 mesh screen; (p) continuously recycling the first portion of fine particles to the pug mill; (q) continuously passing the first portion of oversize particles into the upstream end of a crusher; (r) continuously crushing the first portion of oversize particles in the crusher; (s) continuously removing the thus crushed particles from the downstream end of the crusher; (t) continuously passing the thus crushed particles to a second screen having a single deck with about a 10–14 mesh screen therein; (u) continuously screening the thus crushed particles to obtain a second portion of fine particles and a second portion of oversize particles; (v) continuously recycling the second portion of fine particles to the pug mill; (w) continuously recycling the second portion of oversize particles into the upstream end of the crusher; (x) continuously passing a quantity of product size granules sufficient to maintain the recycle ratio within the range of about 3:1 to 10:1 to the crusher; and (y) recovering the remainder of the product size granules.

In other embodiments of this invention: (a) the particulate zinc oxide analyzes at least about 90% ZnO; (b) the ammoniating fluid is liquid anhydrous ammonia; (c) the orthophosphoric acid is wet process orthophosphoric acid analyzing about 52–55% $P_2O_5$; and (d) the recycle ratio is about 4:1 to 8:1.

In the drawings: FIGS. 1–2 constitute a flowsheet of the process of this invention.

It is an object of this invention to provide a continuous multistep process for preparing granular zinc ammonium phosphate.

Another object of this invention is to provide a continuous multistep process for preparing granular zinc ammonium phosphate from phosphoric acid, zinc oxide, and ammonia in a yield of at least about 95% of theory.

The following table presents a tabulation of the residence times which have been used in the process of this invention. The broad ranges, not in parenthesis, have given excellent results; however, the somewhat narrower ranges listed in parenthesis in the table are those which constitute the preferred residence times:

RESIDENCE TIMES

In Agitated Reactor;
    ca. 30–150 minutes  (ca. 50–100 minutes)
In Agitated Mixer;
    ca. 15–100 minutes  (ca. 20–80 minutes)
In Pug Mill;
    ca. 8–25 minutes  (ca. 10–20 minutes)
In Rotary Granulator;
    ca. 10–20 minutes  (ca. 12–15 minutes)
In Drier;
    ca. 15–45 minutes  (ca. 20–35 minutes)
In Cooler;
    ca. 15–45 minutes  (ca. 20–35 minutes)

Granular material exit the downstream end of the pug mill has a temperature of about 130–225° F.; said material has a moisture content of about 3–10%. Granules exit the rotary granulator generally have a temperature of about 130–200° F. and a moisture content of about 3–10%.

The following table presents the operating temperatures which I have found to give excellent results.

OPERATING TEMPERATURES, ° F.

| | Drier | Cooler |
|---|---|---|
| Entering Temperature of Granules | ca. 130–200 | ca. 200–230 |
| Exit Temperature of Granules | ca. 215–240 | ca. 70–130 |
| Entering Temperature of Air | ca. 300–450 | ca. 40–95 |
| Exit Temperature of Air | ca. 150–250 | ca. 60–120 |

It has been found that zinc ammonium phosphate, especially in granular form is useful as an additive to animal feeds for the purpose of furnishing zinc to remedy zinc deficiencies in the diets of animals. It has also been found that zinc ammonium phosphate is highly useful as a fertilizer because it supplies the trace element zinc as well as nitrogen and $P_2O_5$ values to the soil. Since zinc ammonium phosphate is only slightly soluble in water, it constitutes, where added to the soil: (1) a slow release source of the trace element zinc; and (2) a slow release source of nitrogen and $P_2O_5$ values which are well known plant nutrients. Slow release fertilizers and slow release trace element sources are especially valuable because they are not readily leached from the soil as is the case with such water soluble (quick-release) materials as urea, zinc chloride, zinc sulfate, ammonium phosphate, ammonium nitrate, and the like. It has been found that where using zinc ammonium phosphate as a slow release N and $P_2O_5$ fertilizer and as a slow release source of the trace element zinc, a single application of zinc ammonium phosphate lasts for a year or longer. This eliminates the need for making several applications of fertilizer and a source of zinc values per growing season as would be the case if one added a soluble fertilizer such as urea, ammonium sulfate, or the like, and a soluble source of zinc such as zinc chloride, zinc sulfate, zinc nitrate, or the like.

Zinc ammonium phosphate is particularly valuable as a source of zinc where applied to acid soils which are high in phosphate because zinc ammonium phosphate provides a constant but slowly available source of zinc which is not fixed (i.e., converted into a nonavailable form of zinc by the acid phosphates present in such soil) before it can be utilized by plants growing in such soils.

First general embodiment

In this embodiment an ammoniating fluid selected from the group consisting of liquid anhydrous ammonia and aqueous solutions of ammonia, was continuously reacted with aqueous solutions of orthophosphoric acid in first agitated reactor 1 to form a first slurry comprising ammonium orthophosphate in water, said first slurry having an atomic ratio of N:P to about 1.1:1. Aqueous ammonia solutions analyzing about 20–30% $NH_3$ have given excellent results in the process of this invention; however, I generally prefer to use liquid anhydrous ammonia. Orthophosphoric acid analyzing about 20–60% $P_2O_5$ and selected from the group consisting of wet process orthophosphoric acid and furnace grade orthophosphoric acid have given excellent results in the process of this invention; however, I generally prefer to use wet process orthophosphoric acid analyzing about 52–55% $P_2O_5$. I have obtained excellent results with ammonium orthophosphate slurries having moisture contents of about 18–30%; however, for optimum results, I generally prefer to prepare and use an ammonium phosphate slurry (i.e., a first slurry) having moisture contents of about 20–26%. Water was continuously added to reaction 1 as required to maintain the moisture content of the first slurry within such range.

The first flowable slurry was continuously removed from the bottom of agitated reactor 1, at a rate substantially greater than the rate at which said slurry was formed in said reactor, via line 3 which fed into first flow divider 5. Flow divider 5 fed into lines 7 and 9. The first flow divider was so adjusted that it fed the first flowable slurry into line 9 at substantially the same rate that said slurry was formed in reactor 1. Line 7 fed into the upper portion (top) of reactor 1, and line 9 fed into the upper portion of the upstream end of pug mill 11.

Agitated reactor 1 was covered but it was vented to the atmosphere via an exhaust system comprising line 13 which fed into line 15 which, in turn, fed into scrubber 17. Exhaust air from scrubber 17 passes via line 19 to suction source 21 and thence to the atmosphere. Suction source 21 can be a fan, a jet, or other source of suction. Orthophosphoric acid solution (preferably analyzing about 35–55% $P_2O_5$) passed through scrubber 17 where said acid scrubbed ammonia values from the air and vapor entering scrubber 17 via line 15. Used scrubbing solution passed from scrubber 17 via line 23 to second flow divider 24 which diverted all of said solution to line 28 which fed said solution into the upper portion, or top, of reactor 1. Where using this embodiment of my invention, flow divider 24 was so adjusted that there was no communication between lines 23 and 26.

A second flowable slurry comprising zinc oxide in water was continuously prepared in agitated mixer 25. Particulate zinc oxide and water were continuously passed into said mixer at such rate as to form a slurry having a moisture content of about 60–80%. The rate at which the second flowable slurry was prepared was substantially stoichiometrically equivalent to the rate at which the aforesaid first flowable slurry (the slurry of ammonium orthophosphate) was prepared. The stoichiometry was based upon the reaction represented by the following equation:

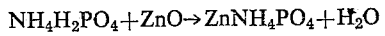
$$NH_4H_2PO_4 + ZnO \rightarrow ZnNH_4PO_4 + H_2O$$

The second flowable slurry was continuously removed from the bottom of mixer 25, at a rate substantially greater than the rate which said slurry was formed in said mixer, via line 27 which fed into third flow divider 29. Flow divider 29 fed into lines 31 and 33. The third flow divider was so adjusted that it fed the second slurry into line 33 at substantially the same rate that said slurry was formed in mixer 25. Line 31 fed into the upper portion (top) of mixer 25, and line 33 fed into the upper portion of the upstream end of pug mill 11.

Agitated mixer 25 was covered, but it was vented to the atmosphere via line 34, fourth flow divider 36 and line 38. Where using the first general embodiment of this invention flow divider 36 was so adjusted that there was no communication between lines 34 and 40.

Pug mill 11 was covered, but it was vented to the atmosphere via line 15 which communicated with scrubber 17 which, in turn, communicated with line 19 which, in turn, communicated with suction source 21 which was vented to the atmosphere. Ammonia valves escaping from the pug mill via line 15 were recovered in scrubber 17 and recycled to the upper portion of reactor 1 via line 23, third divider 24, and line 28. Where using this embodiment of my invention, flow divider 24 was, as stated supra, so adjusted that there was no communication between lines 23 and 26.

Product from later mentioned dust collecting sizing, and crushing steps was recycled to the upper portion of the upstream end of pug mill 11 at such rate as to maintain a recycle ratio of about 3:1 to 10:1, said ratio being the weight ratio of recycled product:recovered product. Although excellent results have been obtained with recycle ratios of about 3:1 to 10:1 for best results I prefer to use a recycle ratio of about 4:1 to 8:1. Ammonium sulfate was added to the upper portion of the upstream end of the pug mill at the rate of about 10–20 lbs. of ammonium sulfate per ton of recovered product. I have found that the addition of this quantity (about 10–20 lbs. per ton of product) of ammonium sulfate improves the quality of the granules produced in the process of this invention. I have obtained excellent results when adding the ammonium sulfate as an aqueous solution of ammonium sulfate; however, I prefer to add particulate ammonium sulfate with the particles of such size as to pass about a 5 mesh screen.

Irregularly shaped granular material was continuously withdrawn from the downstream end of pug mill 11 via conveyor 35. Said irregularly shaped granular material passed from conveyor 35 into the upstream end of rotary drum granulator 37 where the irregular shaped granular material was rotated in the presene of steam and hot water. This treatment converted the irregularly shaped granular material into smooth substantially spherical granules. Hot water was fed into the rotary granulator at a temperature of about 140–200° F. (preferably at about 160–195° F.) and steam was fed into said granulator from a steam line at a pressure of about 20–70 p.s.i.g. (preferably at about 30–45 p.s.i.g.). The rotary drum granulator was vented to thhe atmosphere via line 39 and suction means 41. Said suction means can be a fan, a jet, or other source of suction. Substantially spherical granules passed from the dowstream end of rotary granulator 37 to conveyor 43 and thence into the upstream end of rotary drier 45 where said granules were dried by being rotated in contact with heated air, said air was heated in air heater 47. Air heater 47 can be a direct heater or an indirect heater; however, I prefer to use a direct heater. Air passed through heater 47 and via line 49 to rotary drum drier 45. The heated air can pass through the rotary drum drier in countercurrent or concurrent flow (based on the direction of flow of the granules within the drier). I prefer to use countercurrent flow. Air passed from rotary drum drier 41 to line 51 and thence to cyclone dust collector 53. Air passed through the cyclone dust collector into line 55 and then to the atmosphere via suction means 57. Said suction means can be a fan, a jet or other source of suction. Dust collected in cyclone dust collector 53 was recycled to pug mill 11 via conveyor 59. Dried granules passed from the downstream end of rotary drum drier 45 via conveyor 61 to the upstream end of rotary drum cooler 63 where said granules were cooled by rotating in the presence of a stream of air which entered the cooler at ambient temperature. The dried granules entered rotary cooler 63 at about 200–230° F. and exited from the downstream end of said cooler (via conveyor 67) at a temperature of about 60–130° F. Air can be passed through rotary cooler 63 countercurrent to or concurrent to the direction of flow of the granules through said cooler 63 passed via line 65 to line 51, which, as stated supra, passed through cyclone dust collector 53, and then to the atmosphere via line 55 and suction source 57. As stated supra, dust collected in cyclone dust collector 53 passed, via conveyor 59, to the upper portion of the upstream end of pug mill 11.

Cooled granules passed from cooler 63, conveyor 67, to first screen 69. Screen 69 was a double deck screen having in its first deck a screen of about 6–8 mesh (preferably about 8 mesh) and in its second deck a screen of about 10–14 mesh (preferably about 12 mesh). Fines (fine particles, particles passing about a 10–14 mesh screen, preferably about a 12 mesh screen) passed from screen 69 via conveyor 71 to the upper portion of the upstream end of pug mill 11. Oversize particles (particles retained on about a 6–8 mesh screen, preferably on about a 8 mesh screen) passed via conveyor 73 to the upstream end of crusher 75. Said crusher can be a chain mill, a ball mill, a roller mill, or the like. Particles exit the downstream end of crusher 75 passed, via conveyor means 77, to second screen 79. Screen 79 was a single deck screen having about a 10–14 mesh screen (preferably about a 12 mesh screen) in the deck. Fines, particles passing about a 10–14 mesh screen (preferably about a 12 mesh screen), passed from screen 79 via conveyor 81 to the upper portion of the upstream end of pug mill 11. Oversize particles (particles retained on about a 10–14 mesh screen, preferably on about a 12 mesh screen) passed from screen 79, via conveyor 83, to conveyor 73 and thence into the upstream end of crusher 75. Product size particles (particles passing about a 6–8 mesh screen, preferably about an 8 mesh screen, and retained on about a 10–14 mesh screen preferably on about a 12 mesh screen) passed from first screen 69 via conveyor 85 to fifth bypass means 87. Bypass means 87 permitted any portion, or all, or none of the product size particles fed into said bypass means to be passed from said means via conveyor 89 to conveyor 73 and thence to crusher 75. That is, bypass means 87 provided a means by which any portion of product size particles could be crushed, screened and recycled via conveyor 81 to the upper portion of the upstream end of pug mill 11, thereby to permit an accurate control of the recycle ratio. Product not recycled from bypass means 87 via conveyor 89 passer from by pass means 87 via conveyor 91 to a storage area where the product was recovered.

Second general embodiment

In this embodiment the general procedure of the first general embodiment was modified by dispensing with agitated reactor 1 and its auxiliary equipment including line 3, flow divider 5, line 7, line 9, and line 13.

In this embodiment the grade and analysis of the raw materials (liquid anhydrous ammonia, or aqueous ammonia solution, orthophosphoric acid, particulate zinc oxide, and ammonium sulfate) were identical, or substantially identical, with the grade and analysis of the same raw materials used in the first embodiment.

In this embodiment a flowable slurry comprising zinc oxide and ammonia in water was continuously prepared by continuously adding particulate zinc oxide, water and an ammoniating fluid selected from the group consisting of liquid anhydrous ammonia and aqueous anhydrous ammonia analyzed about 20–30% $NH_3$ to agitated mixer 25. Ammonia and zinc oxide were added to agitated mixer 25 at such rates as to have the mole ratio $NH_3$:ZnO within the range of 1:1 to 1.1:1. Water was continuously added to agitated mixer 25 at such rate as to maintain the moisture content of the flowable slurry formed in said mixer within the range of about 60–80% based on the total weight of said slurry.

Slurry formed in agitated mixer 25 was continuously removed from the bottom of mixer 25, at a rate substantially greater than the rate at which said slurry was formed in said mixer, via line 27 which fed into flow divider 29. Flow divider 29 fed into lines 31 and 33. Flow divider 29 was so adjusted that it fed the aforesaid flowable slurry into line 33 at substantially the same rate that said slurry was formed in mixer 25. Line 31 fed into the upper portion (top) of reactor 25 and line 33 fed into the upper portion of the upstream end of pug mill 11.

Mixer 25 was covered, but it was vented to the atmosphere via line 34, flow divider 36, line 40, line 15, scrubber 17, line 19, and suction source 21. Flow divider 36 was so adjusted that there was no communication between lines 34 and 38. Orthophosphoric acid solution (ca. 35–55% $P_2O_5$) passed through scrubber 17 where said acid scrubbed ammonia values from air and vapor entering this scrubber via line 15. Used scrubbing solution passed from scrubber 17, via line 23 to flow divider 24 which diverted all of said solution to line 26 which fed said solution into the upper portion, or top, of mixer 25, thereby to recover ammonia values which escaped from said mixer via line 34.

Orthophosphoric acid solution was continuously passed into pug mill 11 via sparger 12 positioned in the lower portion of the upstream half of the pug mill beneath the rotary blades of the pug mill. Said acid was passed into the pug mill at such rate as to maintain an atomic ratio of Zn:P of about 1:1 in the pug mill. Ammonium sulfate was added to the pug mill at about the rate of 10–20 lbs. of ammonium sulfate per ton of product. Product from dust recovering, screening, and crushing steps was recycled to the pug mill at such rate as to maintain a recycle ratio of about 3:1 to 10:1 (preferably about 4:1 to 8:1).

The pug mill was covered but it was vented to the atmosphere via line 15 which fed into scrubber 17 and thence via line 19 and suction source 21 to the atmosphere. As stated supra, air and vapor passing through scrubber 17 was scrubbed with orthophosphoric acid solution to recover ammonia values which were returned to agitated mixer 25.

Beyond the pug mill the apparatus and procedural steps were substantially identical with those used in the above discussed first general embodiment of this invention.

My invention will be further illustrated by the following examples which are illustrative only and which are not intended to limit the scope of the invention.

EXAMPLE I

Water, orthophosphoric acid analyzing about 53% $P_2O_5$, and liquid anhydrous ammonia were added to an agitated reactor at such rate as to form a first slurry of ammonium phosphate having an atomic ratio of N:P of about 1:1 and a moisture content of about 25%. The resulting slurry was circulated from the bottom to the upper portion of the agitated reactor via a slurry circulating circuit external to the agitated reactor at a rate substantially faster than the rate at which said slurry was formed in the reactor. The slurry circulating system included a first bypass means, whereby a portion of slurry was removed from the slurry circulating circuit at a rate substantially identical to the rate at which slurry was formed in the agitated reactor. The thus removed slurry was passed into the upper portion of the upstream end of a pug mill. The agitated reactor was covered but it was vented to the atmosphere via a vent line which passed to a scrubber. The scrubber communicated with a line which, in turn, communicated with a fan which exhausted scrubbed gas to the atmosphere. Air and gas passing through the scrubber was scrubbed with phosphoric acid solution (ca. 53% $P_2O_5$) and the used scrubbing solution was recycled to the upper portion of the agitated reactor.

A second slurry comprising zinc oxide having a moisture content of about 30% was prepared in an agitated mixer by continuously adding particulate zinc oxide, analyzing about 97% ZnO (all of this zinc oxide passed a 100 mesh screen and substantially all of it passed a 200 mesh screen) and water to the agitated mixer at such rate as to form the slurry of zinc oxide having a moisture content of about 65%. Said second slurry was formed at a rate substantially stoichiometrically equivalent to the rate at which the first slurry was formed. The stoichiometry was based on the reaction represented by the equation:

$$NH_4H_2PO_4 + ZnO \rightarrow ZnNH_4PO_4 + H_2O$$

The resulting slurry was circulated from the lower portion to the upper portion of the agitated mixer, via a slurry circulating circuit external to the agitated mixer, at a rate substantially greater than the rate at which the slurry was formed in the mixer. The slurry circulating circuit included a second bypass means from which slurry was sent via a line to the upper portion of the upstream end of a pug mill at a rate substantially the same as the rate at which the second slurry formed in the agitated mixer. (As stated supra, the rate at which the zinc oxide slurry was formed in the agitated mixer was a rate stoichiometrically equivalent to the rate at which the ammonium phosphate slurry was formed in the agitated reactor.) Thus, the ammonium phosphate slurry and the zinc oxide slurry were added to the pug mill in stoichiometric quantities (i.e., at such rate that the atomic ratio of N:Zn:P of the material in the pug mill was about 1:1:1). Particulate ammonium sulfate (ca., 95% $(NH_4)_2SO_4$), all of which passed about a 5 mesh screen, was added to the upper portion of the upstream end of the pug mill at a rate of about 20 lbs. of said ammonium sulfate per ton recovered product. Product recycled from later mentioned dust recovery, sizing, and crushing steps was recycled to the pug mill at such rate as to maintain a recycle ratio (weight ratio of recycle product:recovered product) of about 7:1.

Residence time in the pug mill was about 10–12 minutes. Hard, irregular granules passed from the downstream end of the pug mill to the upstream end of a rotary drum granulator where the granules were rotated in the presence of steam and hot water, whereby the irregular granules were converted to substantially regular spherical granules. The rotary drum granulator was vented to the atmosphere via line which communicated with an exhaust fan which vented exhaust from the rotary drum granulator to the atmosphere. Granules passed from the downstream end of the rotary drum granulator to the upstream end of a rotary drum drier where said granules were dried by rotating in the presence of a countercurrent steram of heated air (air at about 350–400° F.). Air exit the rotary drum drier pased via a cyclone dust collector and an exhaust fan to the atmosphere. Dust collected in the dust collector was recycled to the upper portion of the upstream end of the pug mill. Granules exit the downstream end of the drier passed via a conveyor to the upstream end of a rotary drum cooler where said granules were cooled by contact with air which entered the cooler at ambient temperature (ca., about 85–90° F.). Air exit the rotary drum cooler passed through the aforesaid cyclone dust collector and the aforesaid exhaust fan to the atmosphere. Dust collected in the dust collector was, as stated supra, recycled to the pug mill. Cooled granules exit the downstream end of the rotary cooler passed via a conveyor to a first screen. Said screen was a double deck screen having an 8 mesh screen in the first deck and a 12 mesh screen in the second deck. Fines (particles passing through the 12 mesh screen) were recycled to the upper portion of the upstream end of the pug mill. Oversize particles (particles retained on the 8 mesh screen) passed via a conveyor to a crusher. Particles exit the crusher passed via a conveyor to a second screen. The second screen was a single deck screen having a 12 mesh screen in the deck. Fine particles from the second screen (particles passing a 12 mesh screen) were recycled to the upper portion of the upstream end of the pug mill. Oversize particles from the second screen (particles retained on the 12 mesh screen) were recycled to the crusher.

Product size granules from the first screen (granules passing the 8 mesh screen and retained on the 12 mesh screen) passed, via a conveyor, to a product bypass means. This bypass means provided a means, whereby the recycle ratio could be adjusted. Any portion, or all, or none, of the product size granules entering said bypass means could be passed via conveyor means to the aforesaid crusher and thence to the second screen from which the crushed particles passing a 12 mesh screen were recycled to the pug mill. In this manner (by adjusting the quantity of product size granules sent to the crusher) the recycle ratio could be adjusted as required—to about 7:1 in this instance. Product size granules not sent to the crusher from the bypass means were sent via a conveyor to a storage area where the product size granules were recovered. The recovered granules were substantially spherical particles passing an 8 mesh screen and retined on a 12 mesh screen. The recovered product analyzed about 97% $ZnNH_4PO_4$, about 1% ammonium sulfate and about 1.5% moisture. The yield of $ZnNH_4PO_4$ was about 96% of theory.

EXAMPLE II

The general procedure of Example I was repeated using raw materials of substantially the same grade and analysis is those of Example I, and said raw materials were used at about the same rates as in Example I. However, in this instance the orthophosphoric acid was fed into the pug mill via a sparger positioned in the lower portion of about the upstream half of the plug mill, beneath the rotary blades of the mill. Also, in this instance, the ammonia was fed into the bottom or lower portion, of the above-mentioned agitated mixer where said ammonia was mixed with water and zinc oxide, thereby to form a flowable slurry comprising zinc oxide, ammonia, and water; said slurry having a moisture content of about 70%. The resulting slurry comprising zinc oxide, ammonia, and water was circulated from the lower portion to the upper portion of the agitated mixer in which said slurry was formed, via a slurry circulating circuit external to the agitated mixer, at a rate substantially greater than the rate at which said slurry was formed in the mixer. The slurry circulation circuit included a bypass means from which slurry was sent via a line to the upper portion of the upstream end of a pug mill at a rate substantially the same as the rate at which said slurry was formed in the agitated mixer. The rate at which the slurry comprising zinc oxide, ammonia, and water was passed into the pug mill was such as to produce in said mill a mixture having an atomic ratio of N:Zn:P of about 1:1:1.

As in Example I, spura, the agitated mixer was covered, but vented to the atmosphere via a venting and scrubbing system comprising a line which communicated with a scrubber which, in turn, communicated with a line which communicated with an exhaust fan vented to the atmosphere. Gas and vapor passing through the scrubber was contacted with orthophosphoric acid solution (ca. 53% $P_2O_5$), as in Example I. In this instance the used scrubbing liquor was passed from the scrubber into the agitated mixer, thereby to recover ammonia values which had escaped from said mixer through the above-mentioned venting system.

The pug mill was covered, but it was vented via a line which communicated with and fed into the above-mentioned venting and scrubbing system.

Ammonium sulfate was fed into the pug mill at the rate of about 20 lbs. per ton of product.

Beyond the pug mill the apparatus and procedural steps were substantially identical with those used in Example I. Except that the quantity of product size granules sent to the crusher (and thus recycled to the pug mill) was reduced to produce a recycle ratio of about 4:1.

The recovered granules were substantially spherical particles passing an 8 mesh screen and retained on a 12 mesh screen. The recovered product analyzed about 97% $ZnNH_4PO_4$, about 1% ammonium sulfate and about 2% moisture. The yield of $ZnNH_4PO_4$ was about 98% of theory.

As used herein the term "percent" (%) means percent by weight, unless otherwise defined where used, the term "parts" means parts by weight, unless otherwise defined where used, and the terms "mesh" and "screen size" refer to U.S. Standard mesh or screen size, unless otherwise defined where used. The term "recycle ratio" means the ratio of parts of product recycled:parts of product recovered.

As will be readily apparent to those skilled in the art, the moving parts (e.g., agitators, pug mill shafts, rotary drums, pumps, fans, etc.) will move, operate, of function where conducting the process of this invention.

In the process of this invention, liquids, slurries, and gases, including dust-laden gases, can be conveyed in lines, mains, conduits, ducts, pipes, and the like. Liquids and slurries can also be conveyed, during gravity-driven flow or for short distances after exit from a pump, in open (or uncovered) chutes, troughs, and the like.

In the process of this invention, solids, including granules, pulverulent material, and crystalline material, can be conveyed in chutes, vibrating chutes, screw conveyors, pneumatic conveyors, elevators, including pneumatic and bucket, or cup type elevators, belt conveyors, bucket, or cup type conveyors, and the like.

Bypass and flow dividing means suitable for use with solids in the process of this invention include: (a) overflow bins having means for varying or controlling the amount of overflow discharged therefrom; (b) overflow bins having means for varying or controlling the amount of underflow discharged therefrom; (c) Y's having their arms positioned downstream with dampers for varying or controlling flow positioned therein; and (d) two leg chutes with movable flow spreaders between the legs. Other bypass and flow dividing means suitable for use with solids in the process of this invention will be readily apparent to those skilled in the art.

Bypass and flow dividing means suitable for use with liquids and slurries in the process of this invention include: (a) Y's having their arms positioned downstream with valves for varying or controlling flow positioned therein or communicating therewith; (b) T's having valves for varying or controlling flow positioned in or communicating with the downstream arms thereof; and (c) wier boxes positioned to receive discharge from pipes, lines, conduits, chutes, and the like, said boxes having two discharge ports or positions with means for controlling or varying the rate of discharge from said ports or positions. Other bypass and flow dividing means suitable for use with liquids and slurries will be readily apparent to those skilled in the art.

Crushers which can be used in the process of this invention include ball mills, chain mills, rod mills, rollers, and the like; still other types of crushers which can be used in the process of this invention will be readily apparent to those skilled in the art.

Where desired, pumps (e.g., centrifugal pumps, slurry pumps, air motivated pumps, and the like) can be used to pump liquids or slurries in the process of this invention. Where practical (i.e., where passing a liquid or slurry from a higher level to a lower level) gravity induced flow can be used in the process of this invention.

The sparger can be a perforated pipe projecting into the pug mill, a block sparger positioned in the bottom of said mill, or perforations in the bottom of the pug mill, said sparger communicating with at least one source of orthophosphoric acid; other types of spargers suitable for use in the process of this invention will be readily apparent to those skilled in the art. A plurality of spargers can be used.

In the process of this invention, either direct or indirect heating can be used to heat air for drying product in the drier; however, it is generally preferred to use direct heating.

Although a twin shaft pug mill is generally preferred in the process of this invention, excellent results have been obtained with a single shaft pug mill.

The term "particulate zinc oxide" as used herein means zinc oxide of such particle size that at least about 95% of the particles will pass through about a 100 mesh screen and substantially all of said particles will pass through about a 50 mesh screen. Zinc oxide suitable for use in the process of this invention should analyze at least about 75–80% ZnO and preferably at least about 90% ZnO.

The term "phosphate" as used herein means orthophosphate; thus, the term "zinc ammonium phosphate" means zinc ammonium orthophosphate ($ZnNH_4PO_4$); the term "ammonium phosphate" refers to an ammonium orthophosphate selected from the group consisting of $$NH_4H_2PO_4$$

$(NH_4)_2HPO_4$, and mixtures thereof; and the term "acid phosphates" refers to salts of radicals selected from the group consisting of $HPO_4^=$, $H_2PO_4^-$, and mixtures thereof.

What is claimed is:
1. A continuous multistep process for preparing granular zinc ammonium orthophosphate composition in a yield of at least about 95% of theory comprising:
   (a) continuously preparing a first flowable slurry comprising ammonium orthophosphate in water, said slurry having an atomic ratio of N:P of about 1:1 to 1.1:1, by continuously reacting an ammoniating fluid selected from the group consisting of liquid anhydrous ammonia and aqueous ammonia, analyzing about 20–30% $NH_3$, with an aqueous solution of orthophosphoric acid, analyzing about 20–60% $P_2O_5$, selected from the group consisting of wet process orthophosphoric acid and furnace grade orthophosphoric acid in an agitated reactor while continuously adding water to the agitated reactor at such rate as to maintain the moisture content of the first flowable slurry within the range of about 18–30%, based on the total weight of said slurry;
   (b) continuously circulating a substantial portion of the first flowable slurry from the bottom to the top of the agitated reactor in a slurry circulating circuit external to the agitated reactor, and continuously separating a first sidestream of said first flowable slurry from said circuit, said first sidestream being separated at a rate substantially equal to the rate at which the first flowable slurry is formed in the agitated reactor;
   (c) continuously passing the first sidestream into the upper portion of the upstream end of a pug mill;
   (d) continuously preparing a second flowable slurry comprising zinc oxide in water by continuously adding particulate zinc oxide, analyzing at least about 75% ZnO, to an agitated mixer at a rate substantially stoichiometrically equivalent (1:1 to 1.1:1) to the rate at which the first flowable slurry is formed in the aforesaid agitated reactor while continuously adding water to the agitated mixer at such rate as to maintain the moisture content of the second flowable slurry within the range of about 60–80% based on the total weight of said slurry;
   (e) continuously circulating a substantial portion of the second flowable slurry from the bottom to the top of the agitated mixer in a slurry circulating circuit external to the agitated mixer and continuously separating a second sidestream of said second flowable slurry from said circuit, said sidestream being separated at a rate substantially equal to the rate at which the second flowable slurry is formed in the agitated reactor;
   (f) continuously passing the second sidestream into the upper portion of the upstream end of the plug mill;

(g) continuously recycling to the upper portion of the upstream end of the pug mill a sufficient quantity of product from later mentioned sizing and crushing steps to maintain a recycle ratio of about 3:1 to 10:1, said ratio being the weight ratio of recycled product:recovered product;

(h) continuously adding ammonium sulfate to the upper portion of the upstream end of the pug mill at a rate of about 10–20 lbs. of ammonium sulfate per ton of recovered product;

(i) continuously withdrawing irregularly shaped granular material from the downstream end of the pug mill;

(j) continuously passing the withdrawn material into the upstream end of a rotary granulator where the irregular granular material is smoothed by rotating in the presence of steam and hot water, thereby to produce smooth granules;

(k) continuously withdrawing the smooth granules from the downstream end of the ganulator;

(l) continuously passing the smooth granules into the upstream end of a rotary drum drier where the granules are dried by rotating in the presence of a stream of air having an inlet temperature of about 300–450° F.;

(m) continuously withdrawing the dried smooth granules from the downstream end of the rotary drier;

(n) continuously passing the dried smooth granules into the upstream end of a rotary cooler where the granules are cooled by a stream of air which enters the cooler at ambient temperature;

(o) continuously withdrawing the cooled granules from the downstream end of the cooler;

(p) continuously passing the cooled granules to a first screen, said first screen having a double deck with a first deck having a screen of about 6–8 mesh and a second deck having a screen of about 10–14 mesh;

(q) continuously screening the cooled granules, thereby to continuously obtain a first portion of fine particles which pass about a 10–14 mesh screen, a portion of product size granules which pass about a 6–8 mesh screen and are retained on about a 10–14 mesh screen, and a first portion of oversize particles which are retained on about a 6–8 mesh screen;

(r) continuously recycling the first portion of fine particles to the pug mill;

(s) continuously passing the first portion of oversize particles into the upstream end of a crusher;

(t) continuously crushing the first portion of oversize particles in the crusher;

(u) continuously removing the thus crushed particles from the downstream end of the crusher;

(v) continuously passing the thus crushed particles to a second screen having a single deck with about a 10–14 mesh screen therein;

(w) continuously screening the thus crushed particles to obtain a second portion of fine particles and a second portion of oversize particles;

(x) continuously recycling the second portion of fine particles to the pug mill;

(y) continuously recycling the second portion of oversize particles into the upstream end of the crusher;

(z) continuously passing a quantity of product size granules sufficient to maintain the recycle ratio within the range of about 3:1 to 10:1 to the crusher; and (aa) recovering the remainder of the product size granules.

2. The process of claim 1 in which the particulate zinc oxide analyzes at least about 90% ZnO.

3. The process of claim 1 in which the ammoniating fluid is liquid anhydrous ammonia.

4. The process of claim 1 in which the orthophosphoric acid is wet process orthophosphoric acid analyzing about 52–55% $P_2O_5$.

5. The process of claim 1 in which the recycle ratio is about 4:1 to 8:1.

6. A continuous multistep process for preparing granular zinc ammonium orthophosphate composition in a yield of at least about 95% of theory comprising:

(a) continuously preparing a flowable slurry comprising zinc oxide, ammonia, and water by continuously adding particulate zinc oxide analyzing at least about 75% ZnO, an ammoniating fluid selected from the group consisting of liquid anhydrous ammonia and aqueous ammonia analyzing about 20–30% $NH_3$, and water to an agitated reactor at such rates that the mole ratio of $NH_3$:ZnO of the resulting flowable slurry is substantially 1:1 to 1.1:1 and that the moisture content of said slurry is within the range of about 60–80%;

(b) continuously circulating a substantial portion of the flowable slurry from the bottom to the top of the agitated mixer in a slurry circulating circuit external to agitated mixer while continuously separating a sidestream of the flowable slurry from said circuit, said sidestream being separated at a rate substantially equal to the rate at which the flowable slurry is formed in the agitated reactor;

(c) continuously passing the sidestream of flowable slurry into the upper portion of the upstream end of a pug mill;

(d) continuously adding an aqueous solution of orthophosphoric acid, analyzing about 20–60% $P_2O_5$, and selected from the group consisting of wet process orthophosphoric acid and furnace grade orthophosphoric acid to the pug mill via at least one sparger positioned in the lower portion of about the upstream half of the pug mill beneath the blades of the pug mill, said acid being added to the pug mill at such rate as to maintain an atomic ratio of N:P of about 1:1 to 1.1:1 in the pug mill;

(e) continuously recycling to the upper portion of the upstream end of the pug mill a sufficient quantity of product from later mentioned sizing and crushing steps to maintain a recycle ratio of about 3:1 to 10:1, said ratio being the weight ratio of recycled product: recovered product;

(f) continuously adding ammonium sulfate to the upper portion of the upstream end of the pug mill at a rate of about 10–20 lbs. of ammonium sulfate per ton recovered product;

(g) continuously withdrawing irregularly shaped granular material from the downstream end of the pug mill;

(h) continuously passing the withdrawn material into the upstream end of a rotary granulator where the irregular granular material is smoothed by rotating in the presence of steam and hot water, thereby to produce smooth granules;

(i) continuously withdrawing the smooth granules from the downstream end of the granulator;

(j) continuously passing the smoth granules into the upstream end of a rotary drum drier where the granules are dried by rotating in the presence of a stream of air having an inlet temperature of about 300—450° F.;

(k) continuously withdrawing the dried smooth granules from the downstream end of the rotary drier;

(l) continuously passing the dried smoth granules into the upstream end of a rotary cooler where the smooth granules are cooled by a stream of air which enters the cooler at ambient temperature;

(m) continuously withdrawing the cooled granules from the downstream end of the cooler;

(n) continuously passing the cooled granules to a first screen, said first screen having a double deck with a first deck having a screen of about 6–8 mesh and a second deck having a screen of about 10–14 mesh;

(o) continuously screening the thus cooled granules, thereby to continuously obtain a first portion of fine particles which pass about a 10–14 mesh screen, a portion of product size granules which pass about a 6–8 mesh screen and are retained on about a 10–14 mesh screen, and a first portion of oversize particles which are retained on about a 6–8 mesh screen;

(p) continuously recycling the first portion of fine particles to the pug mill;

(q) continuously passing the first portion of oversize particles into the upstream end of a crusher;

(r) continuously crushing the first portion of oversize particles in the crusher;

(s) continuously removing the thus crushed particles from the downstream end of the crusher;

(t) continuously passing the thus crushed particles to a second screen having a single deck with about a 10–14 mesh screen therein;

(u) continuously screening the thus crushed particles to obtain a second portion of fine particles and a second portion of oversize particles;

(v) continuously recycling the second portion of fine particles to the pug mill;

(w) continuously recycling the second portion of oversize particles into the upstream end of the crusher;

(x) continuously passing a quantity of product size granules sufficient to maintain the recycle ratio within the range of about 3:1 to 10:1 to the crusher; and (y) recovering the remainder of the product size granules.

7. The process of claim 6 in which the particulate zinc oxide analyzes at least about 90% ZnO.

8. The process of claim 6 in which the ammoniating fluid is liquid anhydrous ammonia.

9. The process of claim 6 in which the orthophosphoric acid is wet process orthophosphoric acid analyzing about 52–55% $P_2O_5$.

10. The process of claim 6 in which the recycle ratio is about 4:1 to 8:1.

No references cited.

OSCAR R. VERTIZ, *Primary Examiner.*

L. A. MARSH, *Assistant Examiner.*